(12) United States Patent
Kwak et al.

(10) Patent No.: US 10,863,489 B2
(45) Date of Patent: Dec. 8, 2020

(54) METHOD FOR TRANSMITTING UPLINK CONTROL INFORMATION IN WIRELESS COMMUNICATION SYSTEM AND DEVICE THEREFOR

(71) Applicant: LG ELECTRONICS INC., Seoul (KR)

(72) Inventors: Kyuhwan Kwak, Seoul (KR); Suckchel Yang, Seoul (KR); Bonghoe Kim, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 16/315,613

(22) PCT Filed: Jul. 7, 2017

(86) PCT No.: PCT/KR2017/007332
§ 371 (c)(1),
(2) Date: Jan. 4, 2019

(87) PCT Pub. No.: WO2018/009043
PCT Pub. Date: Jan. 11, 2018

(65) Prior Publication Data
US 2019/0141700 A1  May 9, 2019

Related U.S. Application Data

(60) Provisional application No. 62/359,699, filed on Jul. 7, 2016.

(51) Int. Cl.
*H04W 84/04* (2009.01)
*H04W 72/04* (2009.01)
(Continued)

(52) U.S. Cl.
CPC ....... *H04W 72/0413* (2013.01); *H04L 5/0026* (2013.01); *H04L 5/0053* (2013.01);
(Continued)

(58) Field of Classification Search
CPC .......... H04W 72/0413; H04W 72/042; H04W 84/042; H04L 12/24; H04L 41/0233
See application file for complete search history.

(56) References Cited

U.S. PATENT DOCUMENTS

2003/0214958 A1* 11/2003 Madour ................. H04L 12/14
370/401
2008/0273522 A1   11/2008 Luo et al.
(Continued)

OTHER PUBLICATIONS

PCT International Application No. PCT/KR2017/007332, International Search Report dated Nov. 29, 4 pages.
(Continued)

*Primary Examiner* — Wei Zhao
(74) *Attorney, Agent, or Firm* — Lee Hong Degerman Kang Waimey

(57) ABSTRACT

A method for transmitting an uplink control channel in a wireless communication system and a device therefor are disclosed. In detail, the method performed by a user equipment (UE) includes generating a third sequence by aggregating a first sequence with a second sequence, generating a fourth sequence by using the generated third sequence and a specific cyclic shift index corresponding to specific uplink control information, and transmitting the uplink control channel by using the generated fourth sequence, wherein the fourth sequence may be transmitted in at least one symbol constituting a resource region allocated for transmission of the uplink control channel, and wherein the fourth sequence may indicate the specific uplink control information transmitted through the uplink control channel.

12 Claims, 8 Drawing Sheets

(51) Int. Cl.
  *H04L 27/26* (2006.01)
  *H04L 5/00* (2006.01)
(52) U.S. Cl.
  CPC ............ *H04L 5/0091* (2013.01); *H04L 27/26* (2013.01); *H04W 84/042* (2013.01)

(56) References Cited

U.S. PATENT DOCUMENTS

| | | |
|---|---|---|
| 2010/0098012 A1 | 4/2010 | Bala et al. |
| 2012/0134332 A1 | 5/2012 | Lin et al. |
| 2014/0036749 A1* | 2/2014 | Wang .................... H04W 28/12 370/311 |
| 2015/0263843 A1 | 9/2015 | Kim et al. |
| 2017/0331670 A1* | 11/2017 | Parkvall ............ H04W 52/0229 |
| 2018/0123769 A1* | 5/2018 | Pelletier ................. H04L 5/001 |

OTHER PUBLICATIONS

LG Electronics, "Discussion on PUCCH design for HARQ-ACK in shortened TTI", 3GPP TSG RAN WG1 Meeting #84bis, R1-163520, Apr. 2016, 9 pages.

\* cited by examiner (a)

(b)

METHOD FOR TRANSMITTING UPLINK CONTROL INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/007332, filed on Jul. 7, 2017, which claims the benefit of U.S. Provisional Application No. 62/359,699, filed on Jul. 7, 2016, the contents of which are all hereby incorporated by reference herein in their entirety.

TECHNICAL FIELD

The present invention relates to a wireless communication system, and more particularly, to a method for transmitting uplink control information via a sequence-based uplink control channel and a device supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DETAILED DESCRIPTION OF INVENTION

Technical Problem

The present disclosure is to provide a method for transmitting an uplink control channel by a user equipment (UE) in a wireless communication system.

More specifically, the present disclosure is to provide a method for transmitting uplink control information by constituting a sequence-based uplink control channel.

In this regard, the present disclosure is to provide a method for constituting an uplink control channel using Golay complementary sequences (GCS).

Furthermore, the present disclosure is to provide a method for constituting an uplink control channel using an orthogonal cover code (OCC).

Furthermore, the present disclosure is to provide a method for performing multiplexing between UEs applying (or using) a cyclic shift index (CS index) and/or a time-axis orthogonal cover code with respect to the sequence-based uplink control channel, The technical problems to be solved by the present invention are not limited to the technical problems mentioned above, and other technical problems which are not mentioned are clarified to those skilled in the art to which the present invention belongs from the description below.

Technical Solution

A method for transmitting an uplink control channel by a user equipment (UE) in a wireless communication system according to an embodiment of the present invention, the method includes generating a third sequence by aggregating a first sequence with a second sequence, generating a fourth sequence by using the generated third sequence and a specific cyclic shift index corresponding to specific uplink control information, and transmitting the uplink control channel by using the generated fourth sequence, wherein the fourth sequence is transmitted in at least one symbol constituting a resource region allocated for transmission of the uplink control channel, and wherein the fourth sequence indicates the specific uplink control information transmitted through the uplink control channel.

Furthermore, in an embodiment of the present invention, a number of elements constituting the first sequence may be equal to a number of elements constituting the second sequence, and a number of elements constituting the third sequence and the fourth sequence may be configured to be smaller than or equal to a number of resource elements on a frequency domain constituting the resource region.

Furthermore, in an embodiment of the present invention, the first sequence and the second sequence may include a sequence pair in which the sum of an auto-correlation value of the first sequence and an auto-correlation value of the second sequence satisfies 0.

Furthermore, in an embodiment of the present invention, when the number of elements constituting the third sequence and the fourth sequence is smaller than the number of resource elements on the frequency domain constituting the resource region, zero may be mapped to one or more resource elements excluding resource elements to which the fourth sequence is transmitted among a plurality of resource elements of the resource region.

Furthermore, in an embodiment of the present invention, the at least one symbol in which the fourth sequence is transmitted may be multiplexed depending on an orthogonal cover code.

Furthermore, in an embodiment of the present invention, the method may further include receiving, from a base station, cyclic shift index configuration information indicating a configuration of a cyclic shift index group related to transmission of the uplink control channel, and determining the specific cyclic shift index corresponding to the specific uplink control information in the cyclic shift index group.

Furthermore, in an embodiment of the present invention, the cyclic shift index group may include at least one of a first cyclic shift index group or a second cyclic shift index group, and the first cyclic shift index group and the second cyclic shift index group may be allocated to different UEs, respectively.

Furthermore, in an embodiment of the present invention, the cyclic shift index group may include at least one of a first cyclic shift index group or a second cyclic shift index group, and the first cyclic shift index group may be allocated to a first antenna port used for transmission of the uplink control channel, and the second cyclic shift index group may be allocated to a second antenna port used for transmission of the uplink control channel.

Furthermore, in an embodiment of the present invention, the method may further include receiving, from a base station, information indicating an index of the at least one symbol through at least one of higher layer signaling or downlink control information.

Furthermore, in an embodiment of the present invention, the transmitting the uplink control channel using the fourth sequence may include transmitting the uplink control channel by multiplying the fourth sequence by a scrambling sequence, and the scrambling sequence may be generated by using an identifier (ID) of at least one of a transmission and reception point or a cell supporting the UE.

Furthermore, in an embodiment of the present invention, the specific uplink control information may include at least one of information indicating ACK or NACK, information indicating a scheduling request, or information related to a channel state.

A user equipment (UE) for transmitting an uplink control channel in a wireless communication system according to another embodiment of the present invention, the UE includes a transceiver for transmitting and receiving a wireless signal, and a processor functionally connected to the transceiver, wherein the processor is configured to generate a third sequence by aggregating a first sequence with a second sequence, generate a fourth sequence by using the generated third sequence and a specific cyclic shift index corresponding to specific uplink control information, and control to transmit the uplink control channel by using the generated fourth sequence, wherein the fourth sequence is transmitted in at least one symbol constituting a resource region allocated for transmission of the uplink control channel, and wherein the fourth sequence indicates the specific uplink control information transmitted through the uplink control channel.

Advantageous Effects

According to an embodiment of the present invention, even when an uplink control channel is constituted of one symbol, a UE can separate and transmit a plurality of uplink control information to a base station by using a plurality of orthogonal sequences.

Furthermore, according to an embodiment of the present invention, since the UE transmits uplink control information (e.g., ACK/NACK information) using a specific sequence, a reference signal (RS) for uplink control channel transmission may be omitted.

Furthermore, according to an embodiment of the present invention, as the reference signal is omitted, since the UE can continuously (or repeatedly) map the uplink control information to a plurality of symbols, the transmission of uplink control information can be efficiently performed in terms of quantity and/or repetition.

Furthermore, according to an embodiment of the present invention, multiplexing between the UEs can be performed by applying a cyclic shift index to a sequence constituting an uplink control channel.

Furthermore, according to an embodiment of the present invention, when the uplink control channel is constituted of a plurality of symbols, multiplexing performance can be improved by applying time-axis orthogonal cover codes to a plurality of symbols.

The effects obtainable by the present invention are not limited to the above-mentioned effects, and other effects not mentioned can be clearly understood to those skilled in the art to which the present invention belongs from the description below.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

MODE FOR INVENTION

Figure 1:
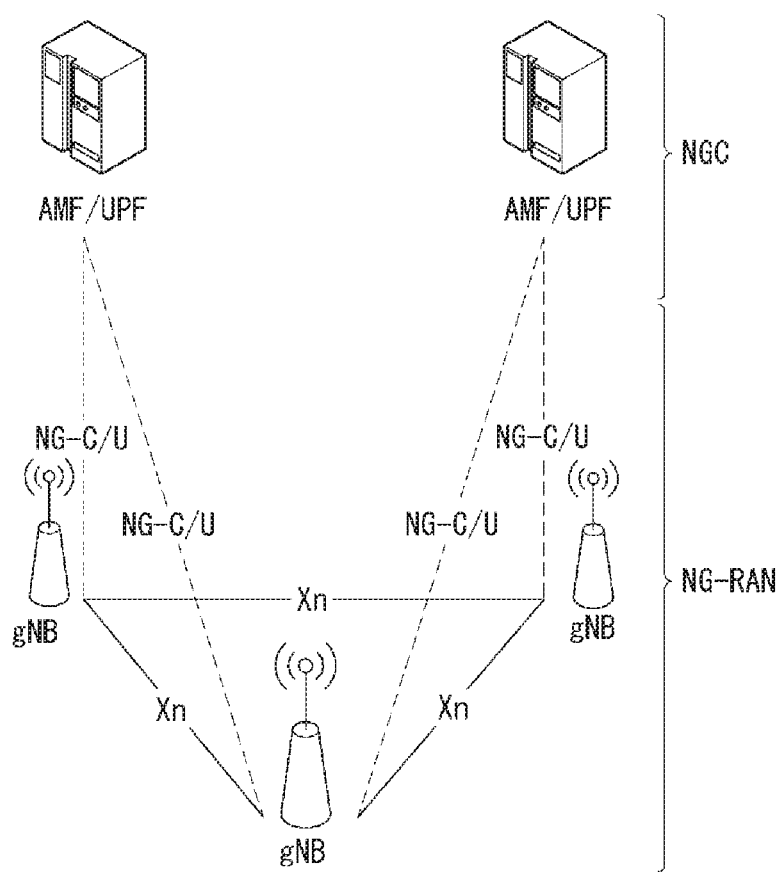
FIG. 1 is a diagram showing an example of a general system configuration of a new RAT (NR) to which a method proposed in this specification may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed.

In the following specification, for convenience of description, a next-generation radio access technology is referred to as a new RAT (NR, radio access technology). A wireless communication system to which the NR is applied is referred to as an NR system.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a user equipment (UE).

The gNBs are connected to each other via an Xn interface.

The gNBs are also connected to an next generation core network (NGC) via an NG interface.

More specifically, the gNBs are connected to an access and mobility management function (AMF) via an N2 interface and a user plane function (UPF) via an N3 interface.

New Rat (NR) Numerologies and Frame Structure

In the NR, a plurality of numerologies is supported. The numerology is defined by a subcarrier spacing and CP overhead. A plurality of subcarrier spacings may be derived by scaling a basic subcarrier spacing by an integer N. A numerology used may be selected independently of a frequency band although it is assumed that a very low subcarrier spacing is not used in a very high carrier frequency. In this case, a flexible network and a UE channel bandwidth are supported.

In the RAN1 spec. viewpoint, a maximum channel bandwidth per NR carrier is 400 MHz. In the case of at least one numerology, the candidates of a maximum subcarrier number per NR carrier are 3300 or 6600 in the RAN1 spec. viewpoint.

Subframe duration is fixed to 1 ms, and a frame length is 10 ms. A scalable numerology needs to permit a subcarrier spacing of at least 15 kHz~480 kHz. All numerologies having a great subcarrier spacing of 15 kHz or more regardless of CP overhead are arranged in a symbol boundary for each 1 ms of an NR carrier.

More specifically, normal CP series are selected as follows.

If a subcarrier spacing is 15 kHz*2n (n is an integer not a negative number),

Each symbol length (including a CP) of the 15 kHz subcarrier spacing is identical with the sum of corresponding 2n symbols of a scaled subcarrier spacing.

In each 0.5 ms, all 01-DM symbols within 0.5 ms have the same size in addition to the first OFDM symbol.

The first OFDM symbol within 0.5 ms is 16 Ts (assuming 15 kHz and an FFT size of 2048) longer than other OFDM symbols.

16 Ts are used in a CP for the first symbol.

If a subcarrier spacing is 15 kHz*2n (n is a negative integer)

Each symbol length (including a CP) of the subcarrier spacing is the same as the sum of corresponding 2n symbols of 15 kHz.

A resource defined by one subcarrier and one symbol is called a resource element (RE).

A physical layer design supports an extended CP. The extended CP is only one in a given subcarrier spacing. An LTE-scaled extended CP is supported in at least 60 kHz subcarrier spacing. A CP type may be semi-statically configured using UE-specific signaling. A UE supporting an extended CP may depend on a UE type/capability.

The number of subcarriers per PRB is 12. An explicit DC subcarrier is not reserved for both the downlink and uplink.

Regarding a DC present within a transmitter, DC processing of a DC subcarrier on the transmitter side is regulated as follows.

A receiver is aware of where a DC subcarrier is placed or whether the location of a DC subcarrier is notified (e.g., by spec. or signaling) or aware of whether a DC subcarrier is not present within a receiver bandwidth.

In the case of the downlink, a UE may assume that a DC subcarrier transmitted by the transmitter (gNB) side has been modulated. That is, data is not rate-matched or punctured.

In the case of the uplink, a DC subcarrier transmitted by the transmitter (UE) side is modulated. That is, data is not rate-matched or punctured.

In the case of the uplink, the transmitter DC subcarrier of the transmitter (UE) side needs to avoid a collision against at least DMRS.

At least one specific subcarrier needs to be defined as the candidate location of a DC subcarrier with respect to the uplink. For example, the DC subcarrier is positioned at the boundary of a PRB.

In the case of the uplink, means for allowing a receiver to determine a DC subcarrier position needs to be designated.

This is associated with a DC subcarrier position written in semi-static signaling from a UE and the standard.

If a DC subcarrier is not present, all subcarriers within a receiver bandwidth are transmitted.

In contrast, on the receiver side, special handling of a DC subcarrier has not been regulated in RAN1 on the receiver side. An operation needs to be implemented. That is, for example, the receiver may puncture data received in a DC subcarrier.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or at least one downlink portion and at least one uplink portion. A slot set is supported. That is, data transmission may be scheduled as one or a plurality of slot spacings.

Furthermore, a mini-slot having the following length is defined.

A mini-slot having at least 6 GHz or more, length 1 symbol is supported.

Lengths from a length 2 to a slot length −1

In the case of URLLC, at least two are supported.

When a slot level channel/signal/procedure is designed, the followings need to be considered.

The possible occurrence of a mini-slot/slot transmission(s) that occupies resources scheduled for the on-going slot transmission(s) of a given carrier with respect to the same/different UEs At least one of DMRS formats/structures/configurations for a slot level data channel is reused for a mini-slot level data channel At least one of DL control channel formats/structures/configurations for slot level data scheduling is designed to be applied to mini-slot level data scheduling.

At least one of UL control channel formats/structures/configurations for slot level UCI feedback is designed to be applied to mini-slot level UCI feedback.

The following use case for designing a mini-slot is considered.

Support of a very low latency time including an URLLC with respect to a specific slot length.

A target slot length is at least 1 ms, 0.5 ms.

In particular, if a TXRP uses beam-sweeping (e.g., 6 GHz or more), a finer TDM granularity for the same or different UE within a slot is supported.

NR-LTE co-existence

Forward compatibility for an unlicensed spectrum operation

Self-Contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

Figure 2:
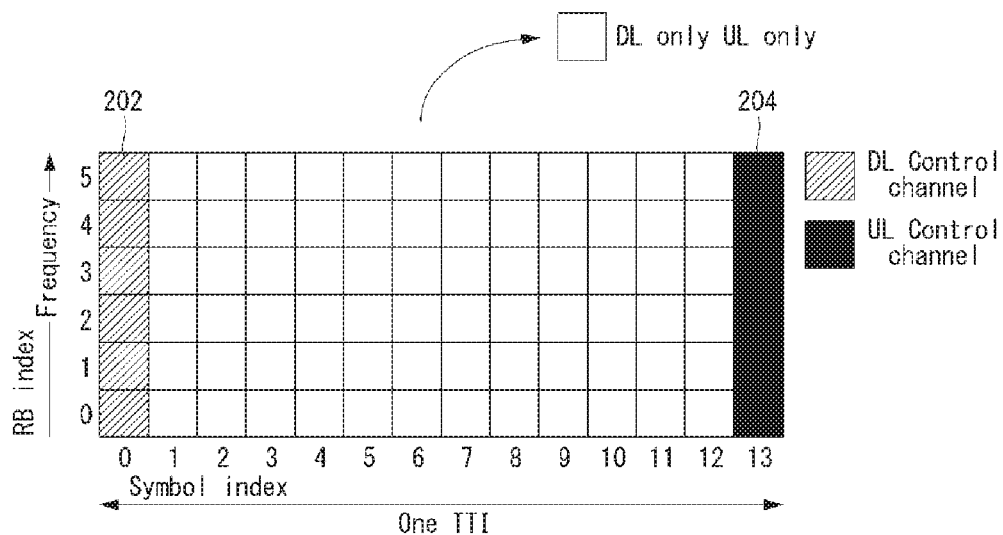
FIG. 2 illustrates an example of a self-contained subframe structure to which a method proposed in this specification may be applied.

FIG. 2 illustrates an example of a self-contained subframe structure to which the method proposed by the present invention may be applied. FIG. 2 is only for convenience of description and does not limit the scope of the present invention.

Referring to FIG. 2, as in the case of legacy LTE, a case where one subframe includes 14 orthogonal frequency division multiplexing (OFDM) symbols is assumed.

In FIG. 2, a region 202 means a downlink control region, and a region 204 means an uplink control region. Furthermore, a region (i.e., region not having separate indication) other than the region 202 and the region 204 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure shown in FIG. 2 is used, downlink transmission and uplink transmission are sequentially performed and the transmission of downlink data and the reception of uplink ACK/NACK may be performed within one self-contained subframe.

As a result, when an error in data transmission occurs, the time taken up to the retransmission of data can be reduced. Accordingly, latency related to data delivery can be minimized.

In a self-contained subframe structure such as FIG. 2, there is a need for a time gap for a process for a base station (eNodeB, eNB, gNB) and/or a terminal (user equipment (UE)) to switch from a transmission mode to a reception mode or from the reception mode to the transmission mode.

In relation to the time gap, if uplink transmission is performed after downlink transmission in the self-contained subframe, some OFDM symbol(s) may be configured as a guard period (GP).

In addition, in the NR system, various types of self-contained subframe structures other than the structure shown in FIG. 2 can be considered.

Figure 3:
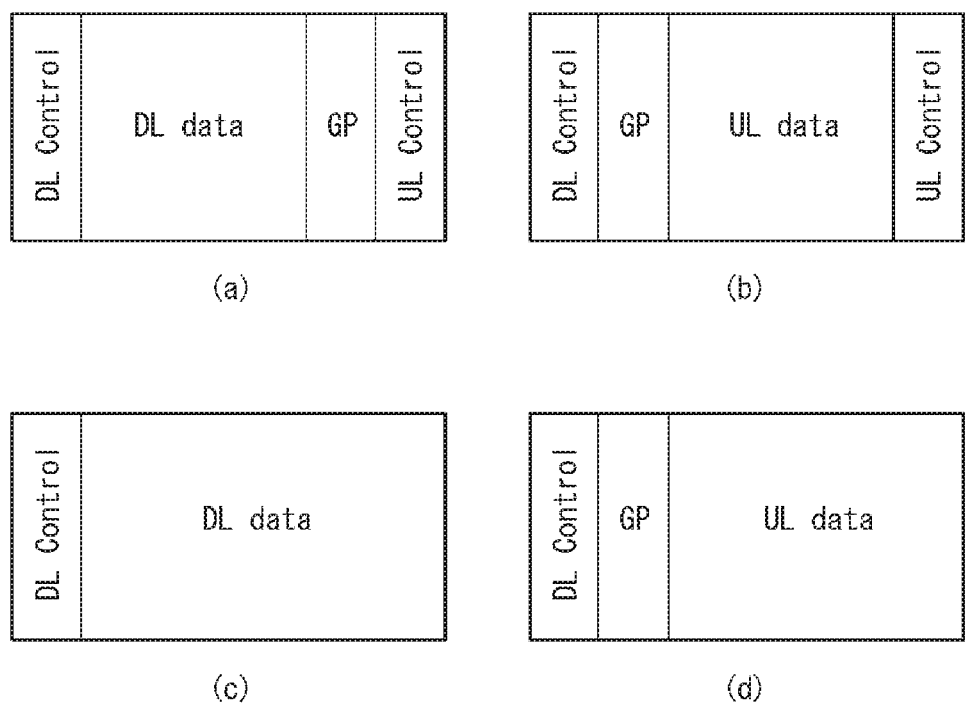
FIG. 3 illustrates examples of a self-contained subframe structure to which a method proposed in this specification may be applied.

FIG. 3 illustrates examples of self-contained subframe structures to which a method proposed in this specification can be applied. FIG. 3 is merely for convenience of description and does not limit the scope of the present invention.

As shown in FIGS. 3 (a) to 3 (d), the self-contained subframe in the NR system can be constituted in various combinations using a DL control region, and a DL data region, a guard period (GP), a UL control region, and/or a UL data region as a unit.

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

Short uplink control information (UCI) and data are frequency-division-multiplexed at least between the UE and the UE in the case where the physical resource blocks (PRBs) for the short UCI and the data do not overlap.

In order to support time division multiplexing (TDM) of short PUCCH from different UEs in the same slot, a mechanism for notifying to the UE whether the symbol(s) in the slot to transmit the short PUCCH is supported at least at 6 GHz or more is supported.

With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.

At least, the short duration PUCCH during 2-symbol duration is supported. In this case, the subcarrier spacings between the downlink (DL) and uplink (UL) data and the short duration PUCCH are the same as each other in the same slot.

At least, a semi-static configuration is supported, in which a PUCCH resource of the UE given in the slot, that is, short PUCCHs of different UEs may be time-division-multiplexed within given duration.

The PUCCH resource includes a time domain and a frequency domain and if applicable, the PUCCH resource includes a code domain.

The short duration PUCCH may be extended to the end of the slot from the viewpoint of the UE. In this case, after the short duration PUCCH, an explicit gap symbol is not required.

In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

At least, a UCI carried by a long duration UL control channel may be transmitted in one slot or multiple slots by a design with a low peak to average power ratio (PAPR).

Transmission using multiple slots is allowed for a total duration (e.g., 1 ms) in at least some cases.

For the long duration uplink control channel, time division multiplexing (TDM) between the RS and the UCI is supported with respect to DFT-S-OFDM.

The long UL part of the slot may be used for transmitting the long duration PUCCH. That is, the long duration PUCCH is supported with respect to both a UL-only slot and a slot having symbols of a variable number constituted by a minimum of four symbols.

At least with respect to a 1 or 2-bit UCI, the UCI may be repeated in N (N>1) slots and the N slots may be adjacent or not adjacent in slots in which the long duration PUCCH is allowed.

At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.

Intra-TTI slot frequency hopping is supported.

A DFT-s-OFDM waveform is supported.

A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set is indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

x-Physical Uplink Control Channel (PUCCH) Format (1) Physical Uplink Control Channel (xPUCCH)

The physical uplink control channel, i.e., xPUCCH, carries the uplink control information. The xPUCCH may be transmitted in a last symbol of the subframe.

All xPUCCH formats adopts cyclic shift and $n_{cs}^{cell}(n_s)$. Here, the cyclic shift is changed by slot number ns. The cyclic shift is defined according to Equation 1.

$$n_{cs}^{cell}(n_s) = \sum_{i=0}^{7} c(8N_{symb}^{UL} \cdot \bar{n}_s + i) \cdot 2^i \quad \text{[Equation 1]}$$

$$\bar{n}_s = n_s \bmod 20$$

In Equation 1, c(i) denotes the pseudo-random sequence and a pseudo-random sequence generator is initialized by $c_{init} = n_{ID}^{RS}$.

The physical uplink control channel supports multiple formats as shown in Table 1.

TABLE 1

| xPUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 96 |

(2) xPUCCH Formats 1, 1a, and 1b

For xPUCCH format 1, information is carried by presence/absence of the transmission of the xPUCCH from the UE. For xPUCCH format 1, d (0)=1 is assumed.

For each of xPUCCH formats 1a and 1b, one or two explicit bits are transmitted. Blocks b(0), . . . , b(Mbit−1) of bits are modulated as described in Table 2, resulting in a complex-valued symbol d(0). Modulation schemes for other xPUCCH formats are given in Table 2.

TABLE 2

| PUCCH format | b(0), . . . , b($M_{bit}$ − 1) | d(0) |
|---|---|---|
| 1a | 0 | 1 |
|    | 1 | −1 |
| 1b | 00 | 1 |
|    | 01 | −j |
|    | 10 | j |
|    | 11 | −1 |

The complex-valued symbol d(0) is multiplexed into a sequence $r_{u,v}^{(\alpha_{\tilde{p}})}(n)$ of cyclically shifted lengths $N_{seq}^{PUCCH}=48$ for each of P antenna ports used for xPUCCH transmission according to Equation 2.

$$y^{(\tilde{p})}(n) = \frac{1}{\sqrt{P}} d(0) \cdot r_{u,v}^{(\alpha_{\tilde{p}})}(n), \quad \text{[Equation 2]}$$

$$n = 0, 1, \ldots, N_{seq}^{PUCCH} - 1$$

In Equation 2, $r_{u,v}^{(\alpha_{\tilde{p}})}(n)$ is defined as $M_{sc}^{RS}=N_{seq}^{PUCCH}$ and an antenna port specific cyclic shift $\alpha_{\tilde{p}}$ is defined as shown in Equation 3.

$$\alpha_{\tilde{p}}(n_s) = 2\pi \cdot n_{cs}^{(\tilde{p})}(n_s)/N_{sc}^{RB} \quad \text{[Equation 3]}$$

$$n_{cs}^{(\tilde{p})}(n_s) = \left[ n_{cs}^{cell}(n_s) + n_{CS}^{xPUCCH,1} + \frac{N_{sc}^{RB}\tilde{p}}{P} \right] \bmod N_{sc}^{RB}$$

$$\tilde{p} \in \{0, 1, \ldots, P-1\}$$

In Equation 3, $n_{CS}^{xPUCCH,1} \in \{0, 2, 3, 4, 6, 8, 9, 10\}$ is configured by higher layers.

The block y of the complex-valued symbols is mapped to z according to Equation 4.

$$z^{(\tilde{p})}(n_{xPUCCH}^{(1)} \cdot N_{xPUCCH}^{RB} \cdot N_{sc}^{RB} + m' \cdot N_{sc}^{RB} + k') = y^{(\tilde{p})}(8 \cdot m' + k) \quad \text{[Equation 4]}$$

In Equation 4, k', m', and $N_{xPUCCH}^{RB}$ are as shown in Equation 5.

$$k' = \begin{cases} k & 0 \leq k \leq 1 \\ k+2 & 2 \leq k \leq 5 \\ k+4 & 6 \leq k \leq 7 \end{cases} \quad \text{[Equation 5]}$$

$$m' = 0, 1, 2, \ldots, 5$$

$$N_{xPUCCH}^{RB} = 6$$

The resources used for transmission of the xPUCCH formats 1, 1a, and 1b are identified by a resource index $n_{xPUCCH}^{(1)}$, and $n_{xPUCCH}^{(1)}$ is configured by the higher layers and indicated on the x-Physical Downlink Control Channel (xPDCCH).

(3) xPUCCH Format 2

The block b(0), . . . , b(Mbit−1) of bits are scrambled by a UE-specific scrambling sequence, resulting in a block $\tilde{b}(0), \ldots, \tilde{b}(M_{bit}-1)$ of scrambled bits according to Equation 6.

$$\tilde{b}(i) = (b(i) + c(i)) \bmod 2 \quad \text{[Equation 6]}$$

In Equation 6, c(i) denotes the pseudo-random sequence and the pseudo-random sequence generator is initialized at the beginning of each subframe by $c_{init} = (\lfloor \bar{n}_s/2 \rfloor + 1) \cdot (2N_{ID}^{cell}+1) \cdot 2^{16} + n_{RNTI}$. Here, $\bar{n}_s = n_s \bmod 20$ and $n_{RNTI}$ denotes a Cell Radio Network Temporary Identifier (C-RNTI).

The scrambled blocks $\tilde{b}(10), \ldots, \tilde{b}(M_{bit}-1)$ of bits are Quadrature Phase-Shift Keying (QPSK) modulated, resulting in blocks d(0), . . . , d(Msymb−1) of the complex-valued modulation symbols. Here, Msymb is Mbit/2.

1) Layer Mapping

The complex-valued modulation symbols to be transmitted are mapped to one or two layers. The complex-valued modulation symbols d(0), d(Msymb−1) are mapped to the layers $x(i)=[x^{(0)}(i) \ldots x^{(v-1)}(i)]^T$. Here, i=0, 1, . . . , $M_{symb}^{layer}-1$, v denotes the number of layers, and $M_{symb}^{layer}$ denotes the number of modulation symbols per layer.

For transmission at a single antenna port, a single layer is used (i.e., v=1) and the mapping is defined according to Equation 7. In this case, $M_{symb}^{layer}$ is $M_{symb}^{(0)}$.

$$x^{(0)}(i) = d(i) \quad \text{[Equation 7]}$$

For transmission at two antenna ports, a mapping rule of two layers may be defined according to Equation 8. In this case, $M_{symb}^{layer}$ is $M_{symb}^{layer}/2$.

$$x^{(0)}(i) = d(2i)$$

$$x^{(1)}(i) = d(2i+1) \quad \text{[Equation 8]}$$

2) Precoding

A precoder takes a block $[x^{(0)}(i) \ldots x^{(v-1)}(i)]^T$ (here, i=0, 1, . . . , $M_{symb}^{layer}-1$) of vectors as) an input from the layer mapping and generates a block $[y^{(0)}(i) \ldots y^{(P-1)}(i)]^T$ (here, i=0, 1, . . . , $M_{symb}^{ap}-1$) of vectors to be mapped to the resource elements.

For the transmission at the single antenna port, precoding is defined by Equation 9. In this case, i=0, 1, . . . , $M_{symb}^{ap}-1$ and $M_{symb}^{ap}$ is $M_{symb}^{layer}$.

$$y^{(0)}(i) = x^{(0)}(i) \quad \text{[Equation 9]}$$

For the transmission at two antenna ports $\tilde{p} \in \{0, 1\}$, an output $y(i)=[y^{(0)}(i) \, y^{(1)}(i)]^T$ of a precoding operation (here, i=0, 1, . . . , $M_{symb}^{ap}-1$) is defined by Equation 10. In this case, i=0, 1, . . . , $M_{symb}^{layer}-1$ and $M_{symb}^{ap}$ is $2M_{symb}^{layer}$.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{[Equation 10]}$$

The mapping to the resource elements is defined by the operation in quadruplets of the complex-valued symbols. When $w^{(\tilde{p})}(i)=\langle y^{(\tilde{p})}(4i), y^{(\tilde{p})}(4i+1), y^{(\tilde{p})}(4i+2), y^{(\tilde{p})}(4i+3)\rangle$ means a symbol quadruplet i for an antenna port $\tilde{p}$, a block $w^{(\tilde{p})}(0), \ldots, w^{(\tilde{p})}(M_{quad}-1)$ (here, $M_{quad}=M_{symb}/4$) of the quadruplets is cyclically shifted, resulting in $w^{(\tilde{p})}(0), \ldots, w^{(\tilde{p})}(M_{quad}-1)$ (Here, $M_{quad}=M_{symb}/4$). Here, $\overline{w}^{(\tilde{p})}(i)=w^{(\tilde{p})}((i+n_{cs}^{cell}(n_s)) \mod M_{quad})$.

For xPUCCH format 2, the block of the complex-valued symbols is mapped to z according to Equation 11.

$$z^{(\tilde{p})}(n_{xPUCCH}^{(2)} \cdot N_{xPUCCH}^{RB} \cdot N_{sc}^{RB}+m' \cdot N_{sc}^{RB}+k')= w^{(\tilde{p})}(8m'+k) \quad \text{[Equation 11]}$$

In Equation 11, k' and m' are as shown in Equation 12.

$$k' = \begin{cases} k & 0 \leq k \leq 1 \\ k+2 & 2 \leq k \leq 5 \\ k+4 & 6 \leq k \leq 7 \end{cases} \quad \text{[Equation 12]}$$

$$m' = 0, 1, 2, \ldots, 5$$

Further, $n_{xPUCCH}^{(2)}$ is configured by the higher layers and indicated in the xPDCCH.

In the case of the NR system, in order to minimize latency of control information and/or data transmission, a self-contained subframe structure and/or a structure in which a transmission time interval (short TTI) is configured to be short (i.e., a short TTI structure) may be considered. In particular, when the self-contained subframe structure is used, the UE can transmit uplink (UL) feedback more quickly for data transmitted on a downlink (DL).

Thus, the NR system may be constituted more flexibly than the existing legacy LTE system. At this time, in the case of the above-described structures (e.g., the self-contained subframe structure, the short TTI structure), the uplink channel for carrying the uplink control information may be configured to be transmitted in at least one symbol. That is, the uplink control channel structure that can be considered in the NR system may be as shown in FIG. 4.

Figure 4:
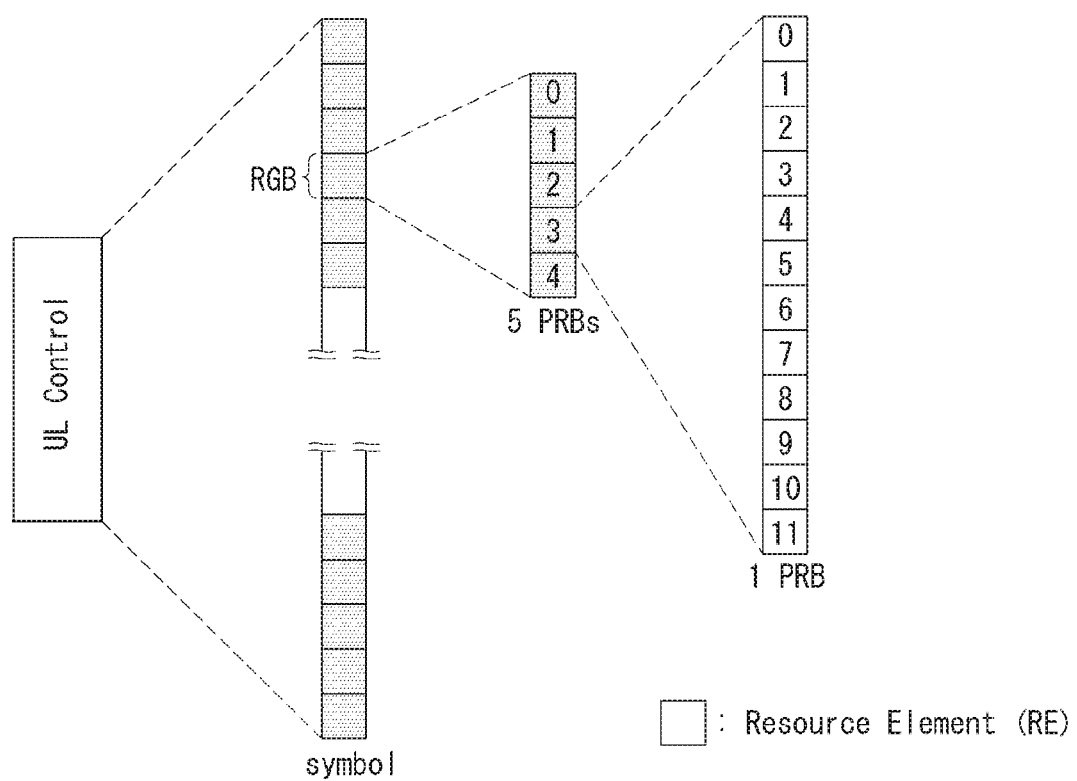
FIG. 4 illustrates an example of an uplink control channel structure applicable to an NR system.

FIG. 4 illustrates an example of an uplink control channel structure applicable to an NR system. FIG. 4 is merely for convenience of explanation and does not limit the scope of the present invention.

Referring to FIG. 4, it is assumed that the UE transmits an uplink control channel constituted in a unit of one symbol (i.e., one OFDM symbol).

As shown in FIG. 4, the uplink control channel of one unit may be constituted depending on units of a resource block group (RBG) and a physical resource block (PRB). At this time, the resource block group may be constituted of five physical resource blocks, and each physical resource block (PRB) may be constituted of 12 resource elements (REs). In other words, the resource block group for the uplink control channel transmission may be constituted of a total of 60 resource elements.

At this time, the number of the physical resource blocks constituting the resource block group may be configured differently. For example, when the resource block group is constituted of six physical resource blocks, the resource block group may be constituted of 72 resource elements. In another example, when the resource block group is constituted of four physical resource blocks, the resource block group may be constituted of 48 resource elements. In addition, the number of resource elements constituting the physical resource block as well as the number of physical resource blocks constituting the resource block group may be constituted differently.

Hereinafter, his specification, as shown in FIG. 4, proposes a transmission scheme for the uplink control channel constituted with at least one symbol in the NR system. Specifically, this specification proposes a method for transmitting the uplink control channel using a sequence (e.g., Golay complementary sequences (GCS)) capable of generating a plurality of sequences having orthogonality according to a processing scheme, and an orthogonal cover code (OCC). That is, this specification proposes a method for transmitting a sequence-based uplink control channel using sequences having orthogonality.

In addition, embodiments described below are divided for convenience of description, some constitutions or features of certain embodiments may be included in other embodiments, or may be replaced with corresponding constitutions or features of the other embodiments.

First Embodiment—Method for Using Golay Complementary Sequence

As described above, in the NR system, the uplink control channel may be constituted with at least one symbol, and a basic structure corresponding thereto needs to be considered. In this case, in order to map uplink control information to the uplink control channel, a method for using Golay complementary sequences (GCS) may be considered.

With respect to GCS, a Golay complementary sequence pair means two different sequences in which the sum of out-of-phase autocorrelation coefficients is zero. At this time, when two different sequences are configured in a binary manner, a length of each sequence may be configured with values of $2^a 10^b 26^c$. Here, a, b, and c mean values (or integers) that are greater than or equal to zero.

For example, a length-10 GCS pair (a, b) may be constituted of 'a=[1 1 −1 −1 1 1 1 −1 1 −1]' and 'b=[1 1 1 1 1 −1 1 −1 −1 1]'. At this time, when auto-correlation values of the two sequences (i.e., a and b) constituting the GCS pair are represented by 'Ra' and 'Rb', respectively, the sum of the auto-correlation values (i.e., Ra+Rb) has a characteristic of 0 when it is out-of-phase and 1 when it is in-phase. Here, the out-of-phase/in-phase means that each of the sequences constituting the GCS pair is out-of-phase/in-phase.

Also, a new GCS pair having a longer length may be generated by recursively constituting such a GCS pair. For example, a length-12 GCS pair can be generated by connecting (i.e., recursively constituting) a length-2 GCS pair and a length-10 GCS pair. Also, the sequence constituting the GCS pair may be constituted of a quaternary scheme (i.e., (1, −1, j, −j)) as well as a binary scheme (i.e., (1, −1)), so that a GCS pair(s) of various lengths can be generated.

A method for transmitting Hybrid Automatic Repeat Request-ACK (HARQ-ACK) in the uplink control channel may be considered by using the characteristics of the GCS pair as described above. For example, in the structure shown in FIG. 4, that is, in the structure in which the resource block group (RBG) is constituted of 60 resource elements, a method for using length-26 Golay complementary sequences (GCS) may be considered.

As described above, a longer-length GCS pair can be generated by constituting a short-length GCS pair recursively. At this time, a minimum unit that can no longer be divided into a short GCS pair may be referred to as a primitive Golay complementary sequence pair. When these primitive GCS pairs are constituted in a binary manner, examples of length-2, 10, and 26 primitive GCS pairs may be as shown in Table 3.

TABLE 3

| Length | Primitive Golay Complementary Sequence pair |
|---|---|
| 2 | a = [1 1] |
|  | b = [1 −1] |
| 10 | a = [−1 1 1 −1 1 −1 1 1 1 −1] |
|  | b = [−1 1 1 1 1 1 1 −1 −1 1] |
|  | or |
|  | a = [1 −1 1 −1 1 1 1 1 −1 −1] |
|  | b = [1 1 1 1 −1 1 1 −1 −1 1] |
| 26 | a = [1 −1 1 1 −1 −1 1 −1 −1 −1 −1 1 1 −1 1 −1 −1 −1 −1 1 1 1 −1 −1 −1 1 1 −1 1 1] |
|  | b = [−1 1 −1 −1 1 1 1 −1 1 1 1 1 −1 −1 −1 −1 −1 −1 −1 1 1 −1 −1 −1 1 1 −1 1] |

At this time, in order to constitute the uplink control channel, a length-56 sequence generated by aggregating (or connecting) the length-26 primitive GCS pair can be used. For example, the length-56 sequence (i.e., [1 −1 1 1 −1 −1 1 −1 −1 −1 1 −1 1 −1 −1 −1 −1 1 1 −1 1 −1 −1 −1 −1 1 1 −1 1 −1 −1 1 1 −1 1 1 1 1 −1 −1 −1 −1 −1 1 1 −1 −1 −1 1 1 −1 1 1 1 −1 1]) may be generated by aggregating (or connecting) sequence b to sequence a of the length-26 primitive GCS pair in Table 3.

In this case, a length of finally used sequence should be less than or equal to the number of resource elements on a frequency axis in a resource region allocated for the uplink control channel. That is, when the resource block group (RBG) of an uplink control channel region is constituted of 60 resource elements, a length of a sequence (i.e., a sequence constituted by aggregating the sequences constituting the primitive GCS pair) used for mapping the uplink control information should be less than or equal to 60. When the length of the finally used sequence is smaller than the number of the resource elements on the frequency axis constituting the resource block group for the uplink control channel region, a method for zero mapping (i.e., zero padding) to remaining resource elements may be considered. For example, when the length 52 sequence is mapped to the resource block group constituted of 60 resource elements, 0 may be mapped to remaining four resource elements. At this time, the four resource elements may be arranged on both sides of the resource block group (i.e., two on each side) or may be arranged on one side.

Figure 5:
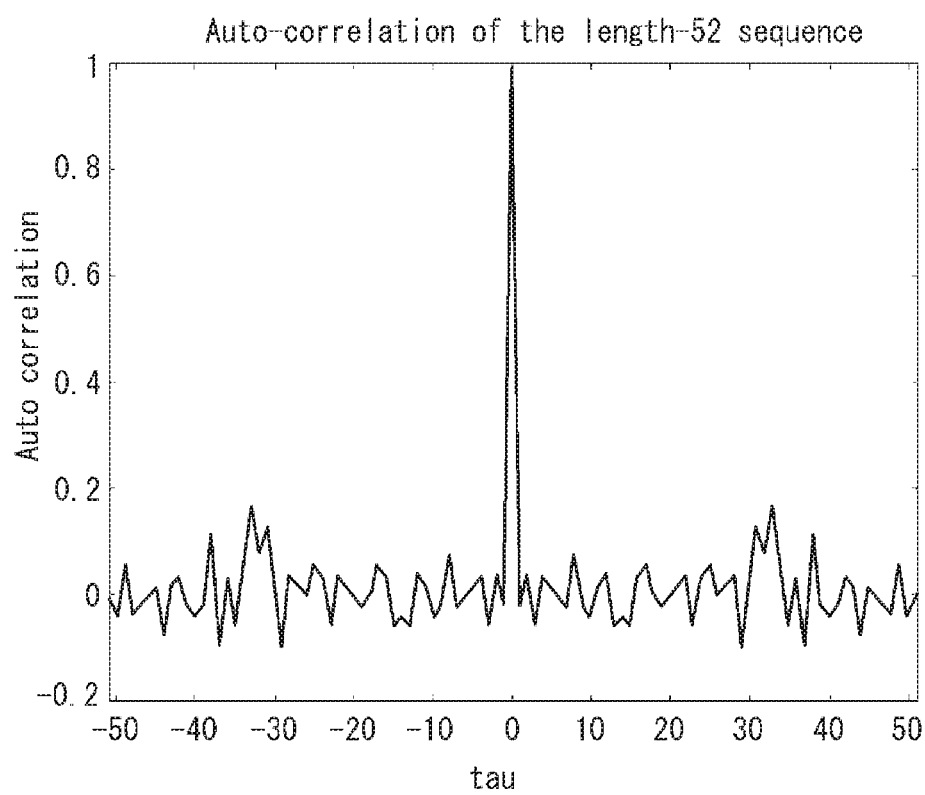
FIG. 5 illustrates an auto-correlation value of a length 52 sequence according to an embodiment of the present invention.

An auto-correlation performance for the length 52 sequence generated by aggregating the length-26 primitive GCS pair is shown in FIG. 5.

FIG. 5 illustrates an auto-correlation value of a length 52 sequence according to an embodiment of the present invention. The x-axis in FIG. 5 indicates time delay (T, tau) between a specific signal generated based on a specific length-26 primitive GCS pair and a delayed signal, and y-axis in FIG. 5 indicates Auto correlation value between the specific signal and the delayed signal. FIG. 5 is merely for convenience of explanation and does not limit the scope of the present invention.

Referring to FIG. 5, it is assumed that the length 52 sequence is constituted by using the length-26 primitive GCS pair as described above.

At this time, a plurality of orthogonal sequences may be generated by applying a cyclic shift (CS) to a sequence (i.e., the length-52 sequence) generated by aggregating the primitive GCS pairs. In this manner, in the case of sequence-based transmission, the UE can perform transmission by using the cyclic shift. Therefore, a fact that auto-correlation performance of a sequence is good (i.e., an auto-correlation value is high) may mean that cross-correlation performance between sequences applied with different cyclic shifts is good.

The method for transmitting the sequence-based uplink control channel proposed in this specification may be applied to both a single-carrier frequency division multiple access (SC-FDMA) scheme and/or an orthogonal frequency division multiplexing (OFDM) scheme. Therefore, the cyclic shift (CS) applied to the sequence may also be implemented in consideration of each scheme.

For example, in the case of the SC-FDMA scheme, the cyclic shift may be defined as Equation 13.

$$s_{cs}(n) = s((n+c) \bmod L) \qquad \text{[Equation 13]}$$

In Equation 13, '$s_{CS}(n)$' may mean a cyclic-shifted sequence, '$s(n)$' may mean a sequence (e.g., a length-56 sequence) for transmitting uplink control information, 'c' may mean a cyclic shift (CS) index, 'n' may mean an element index of a sequence, and 'L' may mean a length of a sequence. Here, the element index of the sequence may correspond to a subcarrier index in the case of the SC-FDMA.

For another example, in the case of the OFDM scheme, the cyclic shift may be defined as Equation 14.

$$s_{cs}(n) = s(n) * e^{j\frac{2\pi * c}{L}n} \qquad \text{[Equation 14]}$$

In Equation 14, '$s_{CS}(n)$' may mean a cyclic-shifted sequence, '$s(n)$' may mean a sequence (e.g., a length-56 sequence) for transmitting uplink control information, 'c' may mean a cyclic shift (CS) index, 'n' may mean an element index of a sequence, and 'L' may mean a length of a sequence.

Referring to Equations 13 and 14, it is assumed that the cyclic shift is applied to an entire sequence (i.e., a sequence for transmitting the uplink control information) used for the uplink control channel transmission.

In order for a sequence proposed in this specification to be used for transmission of the uplink control channel, orthogonality between sequences must be maintained at a certain level or more. That is, only when the orthogonality between the sequences is guaranteed, the transmission of the uplink control channel can be performed using the corresponding sequence. Therefore, a plurality of sequences constituted by applying the cyclic shift to a sequence constituted (or generated) by aggregating the primitive GCS pairs must satisfy a certain level of orthogonality between the corresponding sequences.

For example, a cross-correlation value calculated by applying the cyclic shift (CS) to the length 52 sequence described above is shown in FIG. 6.

Figure 6:
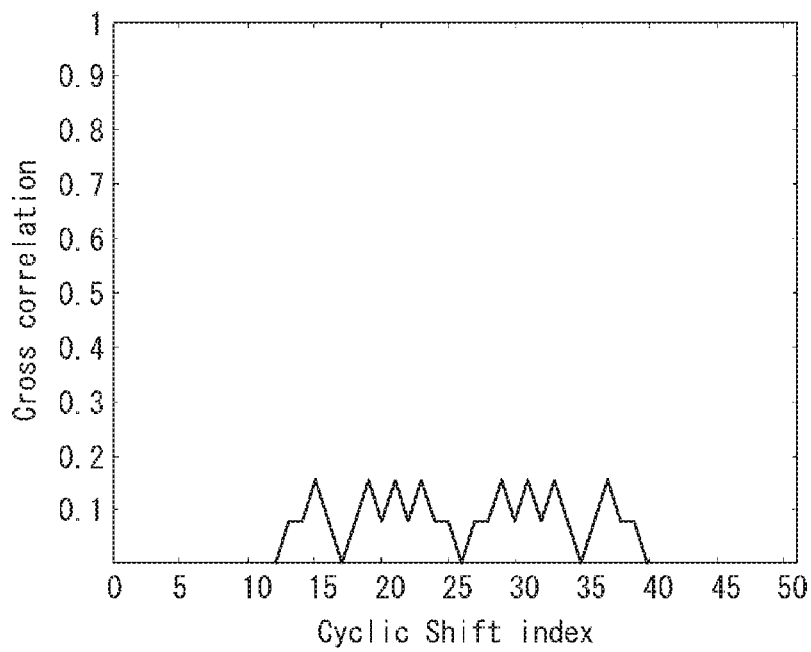
FIG. 6 illustrates a cross-correlation value of a length 52 sequence according to an embodiment of the present invention.
Figure 6:
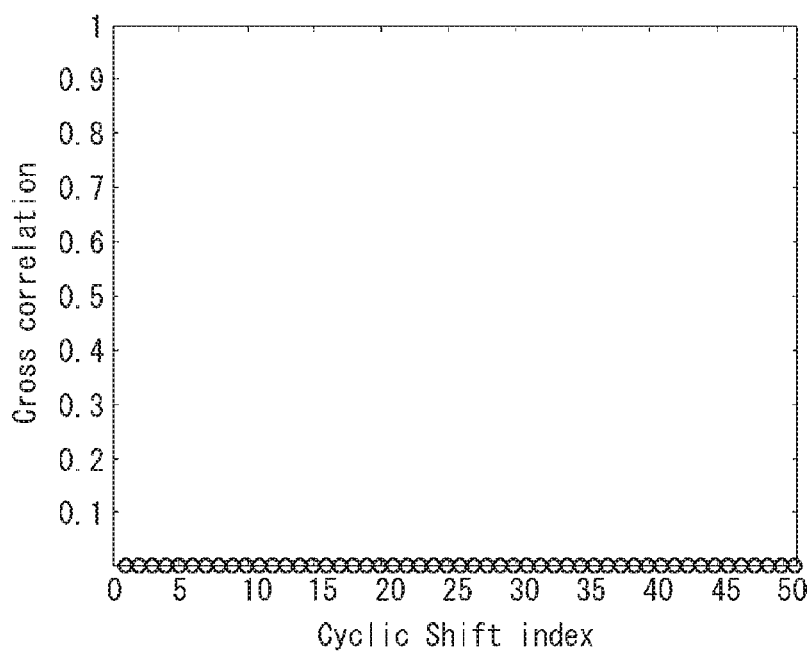

FIG. 6 illustrates a cross-correlation value of a length 52 sequence according to an embodiment of the present invention. FIG. 6 is merely for convenience of explanation and does not limit the scope of the present invention.

Referring to FIG. 6, it is assumed that the length 52 sequence is constituted by using the length-26 primitive GCS pair as described above. That is, the length 52 sequence means a sequence constituted by aggregating the sequences constituting the length-26 primitive GCS pair.

In addition, FIG. 6 (a) illustrates a cross-correlation value when a cyclic shift defined by the SC-FDMA scheme, i.e., Equation 13, is applied, and FIG. 6 (b) illustrates a cross-correlation value when a cyclic shift defined by the OFDM scheme, i.e., Equation 14, is applied.

In the case of FIG. 6 (a), the cross-correlation value according to a cyclic shift index is maintained at about 0.15 or less. That is, in the case of the SC-FDMA scheme, it can be determined that sequences that the cyclic shift is applied to the length 52 sequence maintain orthogonality of a certain level or more between the corresponding sequences.

In the case of FIG. 6 (b), the cross-correlation value according to the cyclic shift index converges to zero. That is, in the case of the OFDM scheme, it can be determined that sequences that the cyclic shift is applied to the length 52 sequence maintain almost perfect orthogonality between the corresponding sequences.

Therefore, in consideration of the cross-correlation characteristics of the cyclic shifted sequence, N orthogonal sequences can be generated (or configured and constituted) by applying N cyclic shifts to a sequence constituted by aggregating the primitive GCS pairs. At this time, the N orthogonal sequences (or N cyclic shift indexes) may be grouped in k units, and k sequences (or k cyclic shift indexes) included in the group may be mapped to k states, respectively. That is, the UE may transmit a specific sequence among the k sequences included in the group to indicate a specific state of k states.

In this case, $$\left\lfloor \frac{N}{k} \right\rfloor$$

UEs may be multiplexed with each other. Here, the above state may mean an expressible case (or condition, information) when the UE transmits the uplink control information through the uplink control channel. Also, a method for configuring a new sequence for the uplink control channel transmission by recursion of the orthogonal sequence may be considered. Also, the UE can transmit the uplink control channel using only a part of the N sequences. That is, considering the cross-correlation value, only some cyclic shift indexes with good orthogonality among a plurality of cyclic shift indexes used to generate the orthogonal sequence may be used.

In connection with transmitting the uplink control channel (or uplink control information) using the N orthogonal sequences, a case where the UE transmits the HARQ-ACK using the orthogonal sequence (i.e., a sequence generated by using the GCS pair) may be considered. In this sequence-based uplink control channel transmission, a separate reference signal (RS) (for example, demodulation reference signal (DM-RS)) is not required compared with the transmission of the uplink control channel (for example, PUCCH) in the existing legacy LTE. This is because the uplink control information for each UE can be distinguished using the orthogonal sequence. Therefore, the sequence can be recursively transmitted to several symbols without considering the reference signal, so a more flexible uplink control channel constitution can be possible. The transmission of the uplink control channel (or uplink control information) of the existing sequence-based scheme can be performed in a manner described in the following example.

For example, a method in which two cyclic shift (CS) indexes are constituted (i.e., grouping the N cyclic shift indexes into two units) as one index pair and allocated to each UE may be considered. In this case, each of the cyclic shift indexes included in the index pair may correspond to ACK (i.e., a first state in a 1-bit HARQ-ACK transmission) and NACK (i.e., a second state in the 1-bit HARQ-ACK transmission).

Alternatively, when the UE transmits 2-bit HARQ-ACK, a method may be considered in which four cyclic shift indexes are allocated to each UE to configure a first state ([ACK, ACK]), a second state ([ACK, NACK]), a third state ([NACK, NACK]), and a first state ([NACK, ACK]) to be divided. That is, the N cyclic shift indexes are grouped into four units, and each index group can be allocated to each UE for 2-bit HARQ-ACK transmission.

Alternatively, in the case of the 2-bit HARQ-ACK transmission, a method for allocating two cyclic shift indexes to each UE by constituting one bit through bundling may be considered. When the bundling is applied, the cyclic shift indexes may be allocated to the UE in the same manner as the 1-bit HARQ-ACK transmission using the index pair. At this time, in the case of the 2-bit HARQ-ACK transmission, two modes can be configured and the bundling or the 2-bit ACK/NACK transmission can be changed depending on a condition (e.g., network condition, UE capability, etc.). The configuration of whether or not the bundling is applied may be indicated (or designated) to the UE through higher layer signaling and/or physical layer signaling (e.g., downlink control information (DCI)) by the base station. Alternatively, the configuration of whether or not the bundling is applied may be implicitly determined depending on the situation (e.g., network situation, UE capability, etc.).

Also, if all the base stations use identically the sequence proposed in the present invention, inter-cell interference problems may occur. Accordingly, in order to use the method for transmitting a sequence-based uplink control channel in a plurality of base stations, a method for additionally applying a scrambling sequence to randomize the interference for the sequence (or orthogonal sequence) described above can be considered. In this case, the scrambling sequence may be generated (or constituted, configured) using a cell identifier (Cell ID), a transmission and reception point (TRP) identifier (ID), and/or a virtual cell ID, etc.

Further, in various embodiments of the present invention, a sequence constituted by recursion of the short-length GCS pair as well as the primitive GCS pair may be used for the constitution of the uplink control channel. In this case, sequences of various lengths may be considered, and an appropriate resource allocation unit may be configured depending on the length of the sequence to be constituted (or generated, configured). Alternatively, as described above, when the length of the generated sequence does not match the allocated resource region (i.e., the number of resource elements on the frequency axis of the allocated resource region), a method in which a resource region larger than the length of the corresponding sequence is allocated and remaining region is transmitted to zero (i.e., zero padding) may be considered.

Further, when a sequence is generated by the methods described above (that is, when a sequence is generated by aggregating the primitive GCS pair and/or the short-length GCS pair), in order to improve auto-correlation and/or cross-correlation performance, a sequence may be generated by additionally multiplying an appropriate cover code (e.g., an orthogonal cover code (OCC)).

Further, the uplink control channel of a unit of one symbol constituted by the above-described methods may be extended to a plurality of symbols through a scheme such that it is recursively transmitted in units of several symbols. In this case, a cyclic shift index pair may be allocated differently for each symbol. For example, when cyclic shift index pairs for the 1-bit HARQ-ACK transmission are constituted of (0, 1) and (2, 3) and the uplink control channel region is constituted of two symbols, (0, 1) may be allocated to a first symbol, and (2, 3) may be allocated to a second symbol. At this time, a first UE may transmit the uplink control channel in the first symbol, and a second UE may transmit the uplink control channel in the second symbol. That is, a different UE for each symbol may transmit the uplink control channel.

In this case, an inter-UE multiplexing performance may be improved by applying a time-axis orthogonal cover code (OCC) having the same length as the number of symbols constituting the uplink control channel. Also, when inter-UE sequences can be orthogonally distinguished into the cyclic shift index pairs, multiplexing can also be performed between UEs having different transmission time intervals (TTI).

At this time, the base station may transmit (indicate) to the UE configurations (i.e., configuration information) (for example, an orthogonal cover code (OCC), a cyclic shift (CS) index, a length of a sequence to be used for uplink control channel transmission, information indicating a specific symbol, etc. to be allocated to a specific UE among one or more symbols constituting an uplink control channel region, and/or whether to apply bundling for 2-bit HARQ) that can be changed in the present invention through higher layer signaling and/or downlink control information (DCI). Alternatively, the base station may inform (or indicate) the configurations to the UE through an implicit method, such as a control channel element (CCE), etc.

Figure 7:
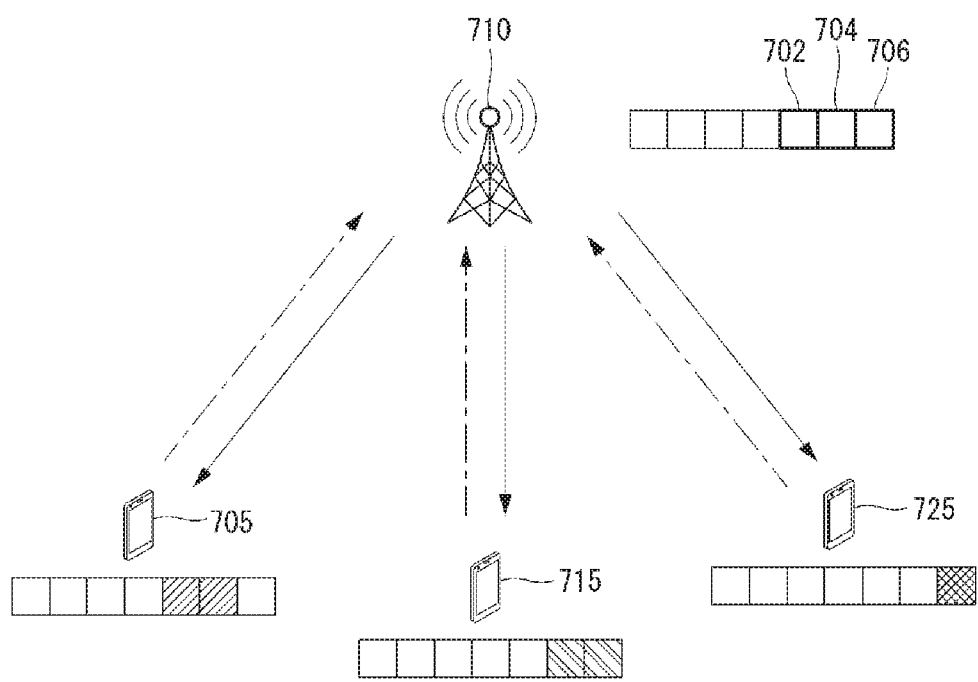
FIG. 7 illustrates an example of a method for transmitting an uplink control channel to a base station by a UE according to various embodiments of the present invention.

FIG. 7 illustrates an example of a method for transmitting an uplink control channel to a base station by a UE according to various embodiments of the present invention. FIG. 7 is merely for convenience of explanation and does not limit the scope of the present invention.

Referring to FIG. 7, it is assumed that a base station 710 allocates one or more symbols of an uplink control channel region constituted of symbols 702, 704, and 706 to UEs 705, 715, and 725. In this case, an uplink control channel may be configured according to a time division multiplexing (TDM) scheme. In the case of FIG. 7, the uplink control channel region is constituted of 3 symbols out of 7 symbols (for example, 1 slot in legacy LTE), this is for convenience of explanation only, and various numbers of symbols may be constituted.

In addition, unlike a physical uplink control channel of legacy LTE, the uplink control channel constituted according to a scheme proposed in this specification may be transmitted without a reference signal (for example, a demodulation reference signal (DM-RS)). That is, in the case of the uplink control channel region proposed in this specification, transmission of uplink control information (for example, ACK/NACK transmission) may be performed continuously (or recursively) in all the symbols constituting the uplink control channel region.

For example, the base station 710 may allocate the symbols 702 and 704 to the UE 705 for transmission of the uplink control channel. At this time, in order to allocate the symbols 702 and 704, the base station 710 may transmit configuration information (for example, a symbol index) indicating the symbols 702 and 704 to the UE through higher layer signaling and/or downlink control information (DCI). In this case, the base station 710 may additionally indicate a length of a sequence to be used for transmission of the uplink control channel in the UE 705, a cyclic shift (CS) index to be applied to the corresponding sequence, and the like. Also, as described above, the base station 710 may allocate different cyclic shift indexes (or cyclic shift index pairs) to the symbols 702 and 704, respectively. For example, an index pair (0, 1) may be allocated to the symbol 702, and an index pair (2, 3) may be allocated to the symbol 704.

After that, the UE 705 may map a sequence configured based on the configuration information indicated from the base station 710 to the uplink control channel region, and then transmit the corresponding uplink control channel (i.e., the mapped sequence) to the base station 710.

Also, the base station 710, for transmission of the uplink control channel of the UE, may allocate the symbols 704 and 706 to the UE 715 and allocate the symbol 706 to the UE 725. Also in this case, as in the case of the UE 705, the base station 710 may transmit configuration information indicating a symbol allocated for transmission of the uplink control channel, a length of a sequence to be used for transmission of the uplink control channel, a cyclic shift index to be applied to the corresponding sequence, etc. through higher layer signaling and/or downlink control information (DCI) to the UEs 715 and 725.

However, in the case of the UE 705 and the UE 715, the symbol 704 is overlapped and allocated, in order to multiplex between the UE 705 and the UE 715, the base station 710 may allocate the CS index (or a cyclic shift index pair) to be applied to the sequence differently. For example, in order to transmit 1-bit ACK/NACK, the base station 710 may allocate an index pair (0, 1) to the UE 705 and allocate an index pair (4, 5) to the UE 715. In addition, since the symbol 706 is also overlapped and allocated between the UE 715 and the UE 725, the above-mentioned scheme for allocating the cyclic shift indexes differently can be similarly applied.

In addition, in order to improve a multiplexing performance between the UEs, a method for additionally applying an orthogonal cover code (OCC) (i.e., a time-axis orthogonal cover code) to the symbols 702, 704, and 706 may be considered. For example, when the base station has allocated the symbols 702, 704, and 706 to the UEs 705, 715, and 725, a length-3 orthogonal cover code may be applied to the symbols 702, 704, and 706. In this case, the base station may transmit configuration information for the corresponding orthogonal cover code to the UE through higher layer signaling and/or downlink control information.

Further, in various embodiments of the present invention, a method in which the UE transmits the above-described sequence-based HARQ-ACK transmission together with a scheduling request (SR) may be considered. In this case, a cyclic shift (CS) index pool may be configured differently depending on whether the SR is transmitted or not. For example, the base station may allocate a cyclic shift index pair belonging to a cyclic shift index pool (for example, a first CS index pool) configured for SR transmission to the UE transmitting SR and HARQ-ACK together, and allocate a cyclic shift index pair belonging to another cyclic shift index pool (for example, a second CS index pool) to the other UE.

Also, when transmit diversity is considered, the cyclic shift index pool may be configured differently for each antenna. For example, the first cyclic shift index pool for antenna port 0 and the second cyclic shift index pool for antenna port 1 may be constituted. In this case, the base station may allocate a first cyclic shift index pair belonging to the first cyclic shift index pool and a second cyclic shift index pair belonging to the second cyclic shift index pool to the UE. Accordingly, in order to implement the transmit diversity, the UE can transmit the uplink control channel using the allocated cyclic shift index pairs.

As described above, the method for constituting the uplink control channel using the generated sequence based on the characteristic of the Golay complementary sequences (GCS) may be efficient in that it does not require the reference signal when transmitting the uplink control channel. Specifically, a sequence corresponding to the uplink control information may be mapped and transmitted to a symbol used for transmission of a reference signal in legacy LTE. Accordingly, an uplink control channel constitution proposed in this specification is more efficient in terms of quantity and/or repetition of the uplink control information than when the transmission of the reference signal is required.

In addition, using the Golay complementary sequence (GCS) pair constituted of binary (e.g., 1, −1) or quaternary (e.g., 1, −1, j, −j) values is advantageous in that it can reduce complexity in terms of implementation compared to generating an orthogonal sequence in which real and imaginary parts are constituted of complex values rather than integers.

Second Embodiment—Method for Using Orthogonal Cover Code

Further, instead of the Golay complementary sequences (GCS) used in the first embodiment, a method for constituting an uplink control channel by applying (or using) an orthogonal cover code may be considered. When the orthogonal cover code is constituted of length-N, it may be divided into a maximum of N orthogonal resources. That is, the length-N orthogonal cover code may be divided into a maximum of N orthogonal resources. At this time, the N orthogonal resources may be grouped in k units, k orthogonal resources included in the group may be mapped to k states, respectively. That is, the UE may transmit a specific orthogonal resource among the k orthogonal resources included in the group to indicate a specific one of k states. In this case, $$\left\lfloor \frac{N}{k} \right\rfloor$$

UEs may be multiplexed with each other. Here, as described in the first embodiment, the state may mean an expressible case (or condition, information) when the UE transmits the uplink control information through the uplink control channel.

At this time, a length of a sequence transmitted by the UE may be equal to a length of the orthogonal cover code (OCC), or may be a multiple of the length of the orthogonal cover code. For example, when the uplink control channel is constituted in a unit of one physical resource block (PRB) in FIG. 4, a length-12 orthogonal cover code (OCC) may be used. When the length-12 orthogonal cover code (OCC) is used, a total of twelve orthogonal sequences (e.g., an orthogonal sequence generated by applying the cyclic shift index to the orthogonal cover code) may be constituted.

Here, a total of twelve orthogonal sequences constituted above may be used for transmission of the uplink control information (for example, HARQ-ACK transmission). As an example, as described in the first embodiment, a method in which two orthogonal sequences are constituted as one pair and used for transmission of HARQ-ACK may be considered. At this time, the length of the orthogonal cords (OCC) to be used may be variously constituted, configuration of resource allocation depending on the length of the orthogonal cover code may also be constituted similar to that described in the first embodiment.

Also, when the length of the orthogonal cover code used in the uplink control channel constitution is configured to 2n (where n is a value equal to or greater than 1), the orthogonal cover code may be constituted of a Walsh sequence. Alternatively, for other lengths (i.e., lengths excluding 2n), the orthogonal cover code may be constituted of a Discrete Fourier Transform (DFT) sequence. When the orthogonal cover code is constituted of the Walsh sequence, a method for allocating a resource region larger than the length of the sequence and then transmitting the remaining part to zero (i.e., zero padding) may be used. Alternatively, when the orthogonal cover code is constituted of the DFT sequence, the length of the sequence may be configured to be equal to a size of a resource allocation region (i.e., the number of resource elements on the frequency axis).

In addition, the uplink control channel of a unit of one symbol constituted by using the orthogonal cover code may be extended to a plurality of symbols through a scheme such as repeated transmission in units of the plurality of symbols. In this case, a sequence pair may be allocated to each symbol differently. In addition, in order to improve the multiplexing performance, a time axis orthogonal cover code (OCC) having the same length as the number of symbols constituting the uplink control channel may be additionally applied.

In addition, as described in the first embodiment, considering inter-cell interference, a method for additionally applying a scrambling sequence to randomize the interference for a sequence (or an orthogonal sequence) constituted using the orthogonal cover code (OCC) can be considered. In this case, the scrambling sequence may be generated (or constituted, configured) using a cell identifier (Cell ID), a transmission and reception point (TRP) identifier (ID), and/or a virtual cell ID.

In addition, a transmission scheme of 2-bit HARQ-ACK (e.g., bundling), a simultaneous transmission scheme with SR, and a transmission scheme considering transmit diversity described in the first embodiment may be applied to a method for constituting a sequence by using the orthogonal cover code (OCC). In this case, a cyclic shift (CS) index pair may be replaced with a sequence pair, and a cyclic shift (CS) index pool may be replaced with a sequence pool.

In addition, in various embodiments of the present invention, the sequence (e.g., the sequence constituted using the GCS pair, and the sequence constituted using the orthogonal cover code (OCC)) constituted as described above may be utilized as it is for the uplink control channel transmission, and a pseudo random (PR) sequence may be additionally applied to the sequence for each UE. Further, the methods proposed in this specification are not limited to Golay sequences (i.e., Golay complementary sequences (GCS)) and/or the orthogonal cover code (OCC), and can be equally applied to cases in which a plurality of orthogonal sequences can be generated.

Figure 8:
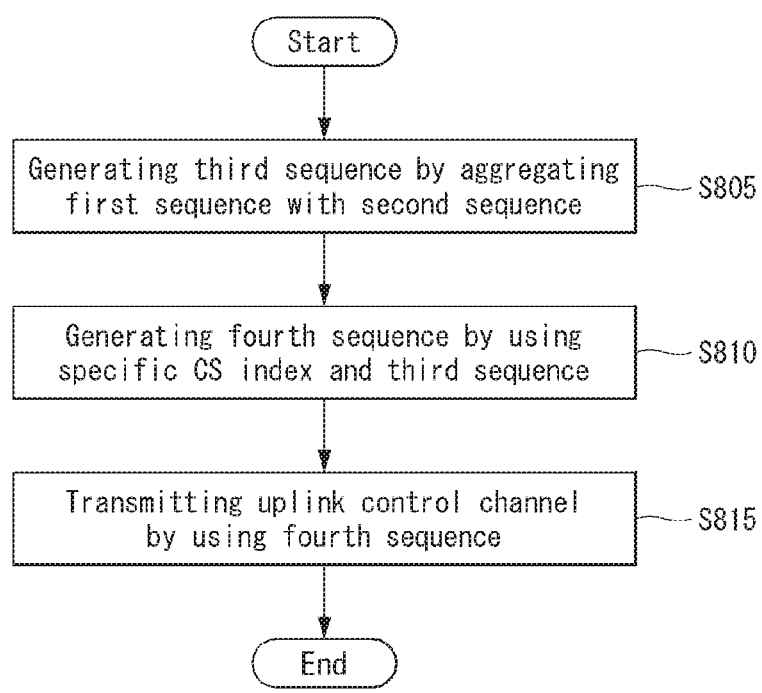
FIG. 8 is a flowchart illustrating an operation of a UE for transmitting an uplink control channel according to various embodiments of the present invention.

FIG. 8 is a flowchart illustrating an operation of a UE for transmitting an uplink control channel according to various embodiments of the present invention. FIG. 8 is merely for convenience of explanation and does not limit the scope of the present invention.

Referring to FIG. 8, it is assumed that the UE transmits a sequence-based uplink control channel. At this time, the UE can receive configuration information (e.g., information about a length of a sequence, a cyclic shift (CS) index to be applied to the sequence, a symbol index to which the sequence is to be transmitted, etc.) related to transmission of the uplink control channel from a base station through higher layer signaling and/or downlink control information (DCI).

In step S805, the UE generates a third sequence by aggregating a first sequence with a second sequence. That is, the UE may generate a new sequence by connecting the first sequence and the second sequence for a sequence-based uplink control channel constitution. At this time, a number of elements constituting the first sequence may be equal to a number of elements constituting the second sequence. That is, when the number of elements in the first sequence is N, the number of elements in the second sequence is N, and the number of elements in the third sequence is 2N. Here, the first sequence and the second sequence may mean sequences constituting the Golay complementary sequences (GCS) pair as described above. The first sequence and the second sequence may include a sequence pair in which the sum of an auto-correlation value of the first sequence and an auto-correlation value of the second sequence satisfies 0. In other words, constituting the third sequence by aggregating the first sequence with the second sequence may mean generating a sequence by aggregating the GCS pairs described in the first embodiment.

After the UE generates the third sequence, in step S810, the UE may generate a fourth sequence by using the generated third sequence and a specific cyclic shift (CS) index. Here, the specific cyclic shift index corresponds to specific uplink control information, and the fourth sequence indicates the specific uplink control information transmitted through the uplink control channel. Here, the specific uplink control information may include ACK/NACK information, scheduling request (SR) information, and/or information related to a channel state.

For example, as in the first embodiment described above, the specific cyclic shift index may mean a specific cyclic shift index indicating an ACK state in 1-bit HARQ-ACK transmission. That is, the fourth sequence may be generated by applying a cyclic shift according to the specific cyclic shift index for the third sequence. At this time, as a plurality of cyclic shifts are applied to the third sequence, a plurality of orthogonal sequences can be generated. That is, the fourth sequence may mean one of the plurality of orthogonal sequences.

In this case, the number of elements of the third sequence and the fourth sequence may be configured to be smaller than or equal to a number of resource elements on a frequency domain in an uplink control channel region (i.e., a resource region allocated for transmitting the uplink control channel). At this time, when the number of elements of the third sequence and the fourth sequence is smaller than the number of resource elements on the frequency domain, zero may be mapped to one or more resource elements excluding resource elements to which the fourth sequence is transmitted (or mapped) among a plurality of resource elements of the uplink control channel region. That is, zero padding may be applied to the remaining resource elements after the sequence is mapped.

After the UE generates the fourth sequence, in step S815, the UE transmits the uplink control channel by using the generated fourth sequence. At this time, the fourth sequence is transmitted in at least one symbol constituting a resource region allocated for transmission of the uplink control channel.

In this case, as described above, an orthogonal cover code (OCC) may be applied to the at least one symbol to which the fourth sequence is transmitted to improve multiplexing performance That is, the at least one symbol may be multiplexed depending on the orthogonal cover code. For example, when the fourth sequence is transmitted in three symbols, a length-3 orthogonal cover code (OCC) may be applied to the three symbols.

Further, in various embodiments of the present invention, the UE can receive, from the base station, cyclic shift index configuration information indicating a configuration of a cyclic shift index group (for example, a cyclic shift index group grouped by k units in the first embodiment) related to transmission of the uplink control channel. In this case, the UE can determine the specific cyclic shift index corresponding to the specific uplink control information in the received cyclic shift index group. Here, the cyclic shift index group may include at least one of a first cyclic shift index group or a second cyclic shift index group. In this case, as described above in the first embodiment, the first cyclic shift index group and the second cyclic shift index group may be allocated to different UEs, respectively. That is, inter-UE multiplexing may be performed by allocating the cyclic shift index group to the UEs, respectively. Alternatively, as described above in the first embodiment, for transmit diversity, the first cyclic shift index group may be allocated to a first antenna port used for transmission of the uplink control channel, and the second cyclic shift index group may be allocated to a second antenna port used for transmission of the uplink control channel.

Also, in various embodiments of the present invention, the UE may receive, from the base station, information indicating an index of the at least one symbol to which the fourth sequence is transmitted. In this case, the UE can receive the corresponding information from the base station through at least one of higher layer signaling or downlink control information (DCI).

Also, in various embodiments of the present invention, as described in the first embodiment above, a method for additionally applying a scrambling sequence to the fourth sequence in consideration of inter-cell interference can be considered. That is, the UE can transmit the uplink control channel by multiplying the fourth sequence by the scrambling sequence. At this time, the corresponding scrambling sequence may be generated by using an identifier (ID) of at least one of a cell (or a virtual cell) or a transmission and reception point (TRP) supporting the corresponding UE.

Overview of Devices to which the Present Invention can be Applied

Figure 9:
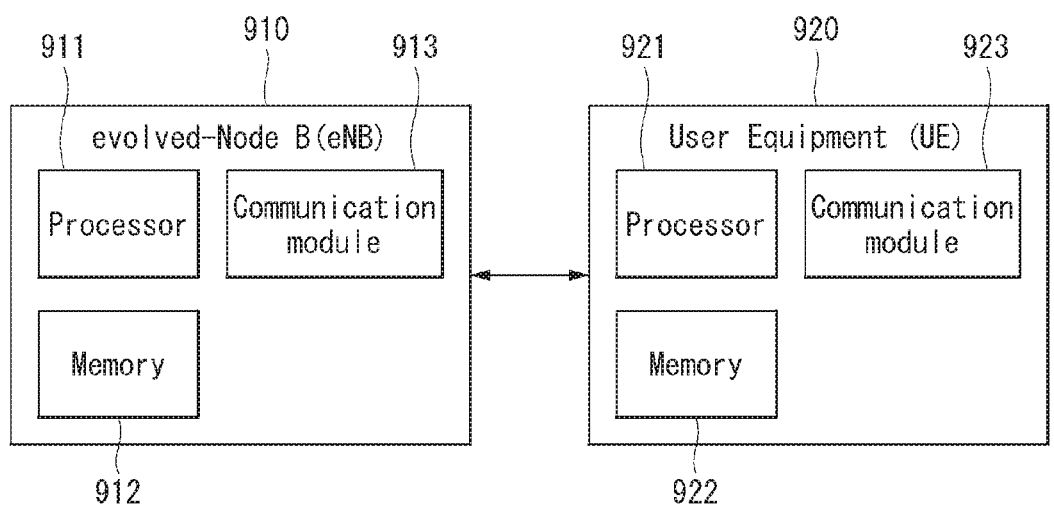
FIG. 9 illustrates a block diagram of a wireless communication device to which methods proposed in this specification may be applied.

FIG. 9 illustrates a block diagram of a wireless communication device to which methods proposed in this specification may be applied.

Referring to FIG. 9, a wireless communication system includes a base station 910 and a plurality of UEs 920 located in the base station 910 region.

The base station 910 includes a processor 911, a memory 912, and a radio frequency unit 913. The processor 911 implements the functions, processes and/or methods proposed in FIGS. 1 to 8 above. Layers of a wireless interface protocol may be implemented by the processor 921. The memory 912, being connected to the processor 911, stores various types of information for driving the processor 911. The RF unit 913, being connected to the processor 911, transmits and/or receives wireless signals.

The UEs 920 includes the processor 911, the memory 912, and the radio frequency unit 913.

The processor 911 implements the functions, processes and/or methods proposed in FIGS. 1 to 8 above. Layers of a wireless interface protocol may be implemented by the processor 921. The memory 912, being connected to the processor 911, stores various types of information for driving the processor 911. The RF unit 913, being connected to the processor 911, transmits and/or receives wireless signals.

The memory 912, 922 can be installed inside or outside the processor 911, 921 and connected to the processor 911, 921 through various well-known means. Also, the base station 910 and/or the UE 920 can have a single antenna or multiple antennas.

Figure 10:
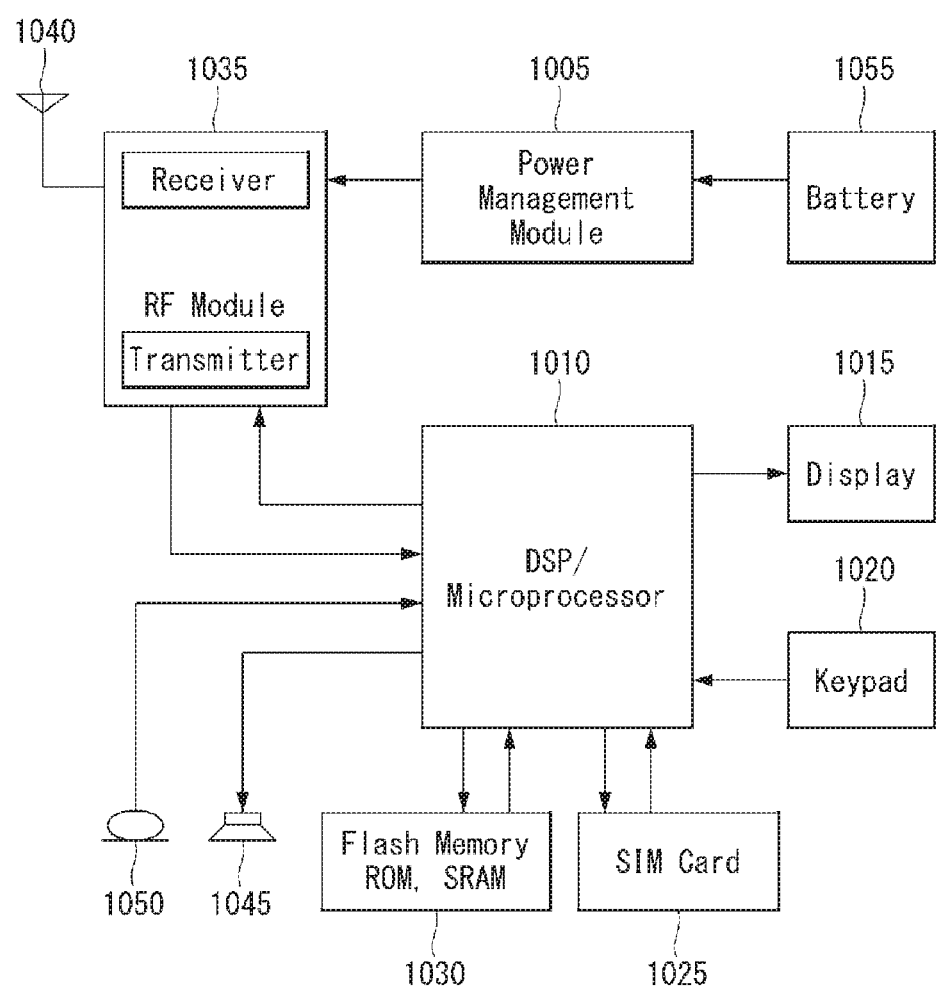
FIG. 10 illustrates a block diagram of a communication device according to an embodiment of the present invention.

FIG. 10 illustrates a block diagram of a communication device according to an embodiment of the present invention.

Particularly, FIG. 10 illustrates the UE of FIG. 9 in more detail.

Referring to FIG. 10, the UE includes a processor (or digital signal processor (DSP)) 1010, an RF module (or RF unit) 1035, a power management module 1005, an antenna 1040, a battery 1055, a display 1015, a keypad 1020, a memory 1030, a Subscriber Identification Module (SIM) card 1025 (which may be optional), a speaker 1045 and a microphone 1050. The UE may include a single antenna or multiple antennas.

The processor 1010 may be configured to implement the functions, processes and/or methods proposed in FIGS. 1 to 8 above. Layers of a wireless interface protocol may be implemented by the processor 1010.

The memory 1030 is connected to the processor 1010 and stores information related to operations of the processor 1010. The memory 1030 may be located inside or outside the processor 1010 and may be connected to the processors 1010 through various well-known means.

A user enters command information, such as a telephone number, for example, by pushing (or touching) the buttons of a keypad 1020 or by voice activation using the microphone 1050. The processor 1010 receives the command information and processes to perform the appropriate function, such as to dial the telephone number. Operational data may be extracted from the SIM card 1025 or the memory 1030. Furthermore, the processor 1010 may display the command and operational information on the display 1015 for the user's recognition and convenience.

The RF module 1035 is connected to the processor 1010, transmits and/or receives an RF signal. The processor 1010 forwards the command information to the RF module 1035, to initiate communication, for example, to transmit wireless signals comprising voice communication data. The RF module 1035 is comprised of a receiver and a transmitter for receiving and transmitting wireless signals. The antenna 1040 functions to transmit and receive wireless signals. Upon receiving the wireless signals, the RF module 1035 can forward the signal for processing by the processor 1010 and convert the signal to baseband. The processed signals may be converted into audible or readable information output via the speaker 1045.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for transmitting an uplink control channel in a wireless communication system of the present invention has been illustrated as being applied to the 3GPP LTE/LTE-A system, a 5G system (New RAT system), but may be applied to various wireless communication systems in addition to them.

What is claimed is:

1. A method for transmitting an uplink control channel by a user equipment (UE) in a wireless communication system, the method comprising:
   generating a third sequence by aggregating a first sequence with a second sequence;
   generating a fourth sequence by using the generated third sequence and a specific cyclic shift index corresponding to specific uplink control information; and
   transmitting the uplink control channel by using the generated fourth sequence,
   wherein the fourth sequence is transmitted in at least one symbol constituting a resource region allocated for transmission of the uplink control channel, and
   wherein the fourth sequence indicates the specific uplink control information transmitted through the uplink control channel.

2. The method of claim 1, wherein a number of elements constituting the first sequence is equal to a number of elements constituting the second sequence, and
   wherein a number of elements constituting the third sequence and the fourth sequence is configured to be smaller than or equal to a number of resource elements on a frequency domain constituting the resource region.

3. The method of claim 2, wherein the first sequence and the second sequence include a sequence pair in which the sum of an auto-correlation value of the first sequence and an auto-correlation value of the second sequence satisfies 0.

4. The method of claim 3, wherein, when the number of elements constituting the third sequence and the fourth sequence is smaller than the number of resource elements on the frequency domain constituting the resource region, zero is mapped to one or more resource elements excluding resource elements to which the fourth sequence is transmitted among a plurality of resource elements of the resource region.

5. The method of claim 3, wherein the at least one symbol in which the fourth sequence is transmitted is multiplexed depending on an orthogonal cover code.

6. The method of claim 2, further comprising:
receiving, from a base station, cyclic shift index configuration information indicating a configuration of a cyclic shift index group related to transmission of the uplink control channel; and
determining the specific cyclic shift index corresponding to the specific uplink control information in the cyclic shift index group.

7. The method of claim 6, wherein the cyclic shift index group includes at least one of a first cyclic shift index group or a second cyclic shift index group, and
wherein the first cyclic shift index group and the second cyclic shift index group are allocated to different UEs, respectively.

8. The method of claim 6, wherein the cyclic shift index group includes at least one of a first cyclic shift index group or a second cyclic shift index group, and
wherein the first cyclic shift index group is allocated to a first antenna port used for transmission of the uplink control channel, and
wherein the second cyclic shift index group is allocated to a second antenna port used for transmission of the uplink control channel.

9. The method of claim 3, further comprising:
receiving, from a base station, information indicating an index of the at least one symbol through at least one of higher layer signaling or downlink control information.

10. The method of claim 3, wherein the transmitting the uplink control channel using the fourth sequence includes transmitting the uplink control channel by multiplying the fourth sequence by a scrambling sequence, and
wherein the scrambling sequence is generated by using an identifier (ID) of at least one of a transmission and reception point or a cell supporting the UE.

11. The method of claim 1, wherein the specific uplink control information includes at least one of information indicating ACK or NACK, information indicating a scheduling request, or information related to a channel state.

12. A user equipment (UE) for transmitting an uplink control channel in a wireless communication system, the UE comprising:
a transceiver for transmitting and receiving a wireless signal; and
a processor functionally connected to the transceiver,
wherein the processor is configured to:
generate a third sequence by aggregating a first sequence with a second sequence;
generate a fourth sequence by using the generated third sequence and a specific cyclic shift index corresponding to specific uplink control information; and
control to transmit the uplink control channel by using the generated fourth sequence,
wherein the fourth sequence is transmitted in at least one symbol constituting a resource region allocated for transmission of the uplink control channel, and
wherein the fourth sequence indicates the specific uplink control information transmitted through the uplink control channel.

* * * * *